March 1, 1932.  L. F. BLUME  1,847,920
VOLTAGE REGULATING METHOD AND SYSTEM
Filed April 19, 1930
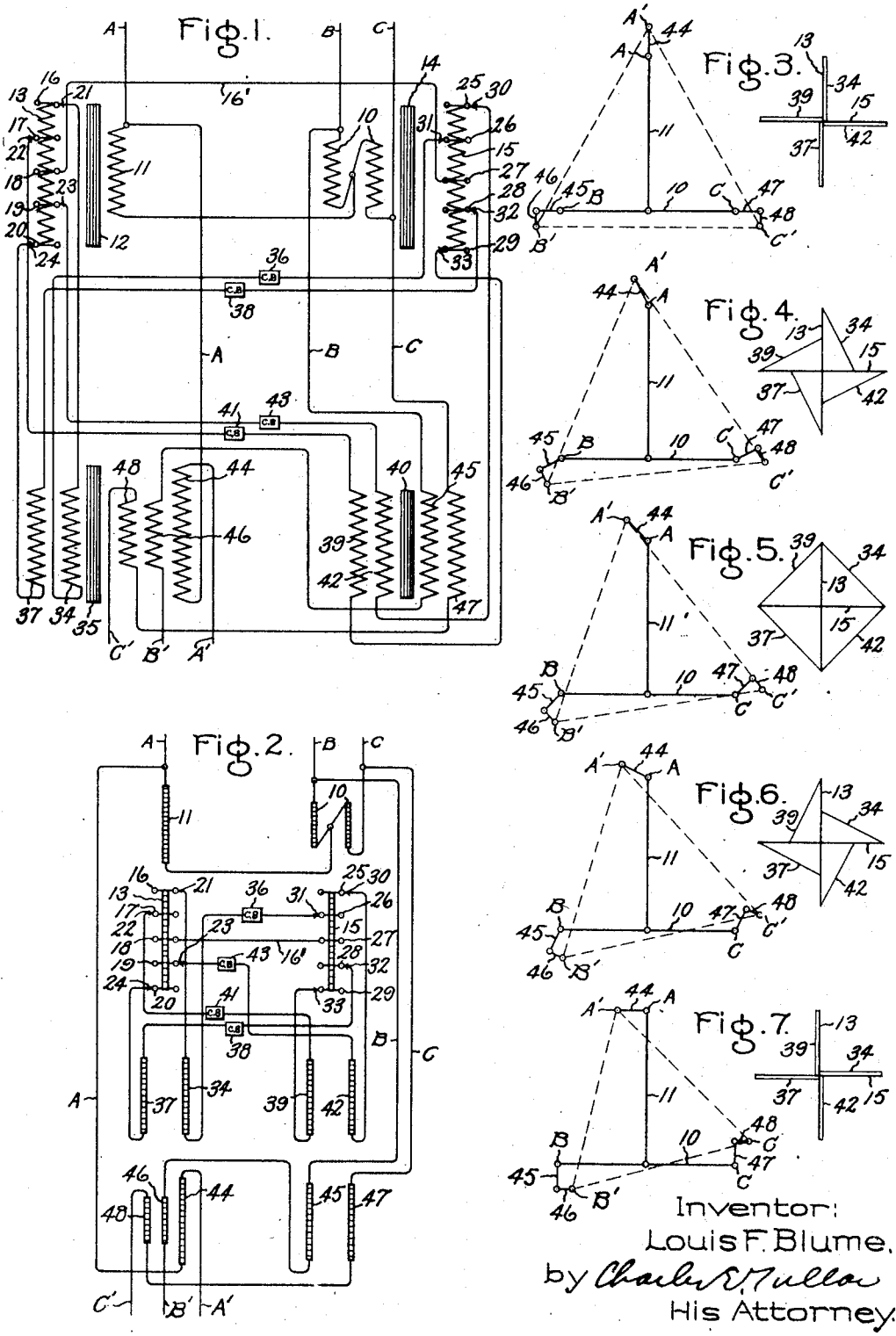
Inventor:
Louis F. Blume,
by Charles E. Mullen
His Attorney.

Patented Mar. 1, 1932

1,847,920

UNITED STATES PATENT OFFICE

LOUIS F. BLUME, OF PITTSFIELD, MASSACHUSETTS, ASSIGNOR TO GENERAL ELECTRIC COMPANY, A CORPORATION OF NEW YORK

VOLTAGE REGULATING METHOD AND SYSTEM

Application filed April 19, 1930. Serial No. 445,765.

My invention relates to voltage regulating methods and systems and more particularly to an improved method and system for regulating the voltage of a three phase circuit. It is inherently simpler and the apparatus required is less costly for regulation of two phase than for regulation of three phase voltage. The general object of the invention is to provide an improved three phase system including two phase windings so arranged that both the value and the phase angle of the three phase voltage may be regulated as desired by suitably varying the connections of the two phase windings.

Further objects and advantages will appear from the following description taken in connection with the accompanying drawings in which Fig. 1 shows diagrammatically a three phase circuit provided with a system arranged in accordance with the invention for regulating the value and phase angle of the three phase voltage; Fig. 2 is a simplified diagrammatic view of the circuits shown in Fig. 1; and Figs. 3 to 7 inclusive are explanatory vector diagrams.

Like reference characters indicate similar parts in the different figures of the drawings.

The invention will be explained as applied to the three phase circuit including the conductors A, B and C shown in Figs. 1 and 2 of the drawings. A winding 10, shown as formed in two equal sections, is connected across the phases B and C and a winding 11 is connected between the phase A and the center of the winding 10. This forms a two phase T-connection with the voltages of the windings 10 and 11 at a right angle and in the ratio of 100 to 86.6. The winding 11 is on the same magnetic core 12 with a winding 13 and the winding 10 is on another magnetic core 14 with a winding 15. A conductor 16' connects the centers of the windings 13 and 15. The turn ratios of the windings 13, 11, 10 and 15 are such that the voltages of the windings 13 and 15 are equal, the voltage of the winding 15 being in phase with the voltage between the phases B and C and at a right angle to the voltage in the winding 13.

The winding 13 is provided with taps 16, 17, 18, 19 and 20 distributed throughout its length and four contacts 21, 22, 23 and 24 movable along the taps. The winding 15 is similarly provided with taps 25, 26, 27, 28 and 29 distributed throughout its length and four contacts 30, 31, 32 and 33 movable along these taps. The number and distribution of the taps are preferably alike in both of the windings 13 and 15 but it is obvious that a different number and movable contacts from that shown in the drawings may be provided if desired.

A winding 34 on a magnetic core 35 is connected in series with a circuit breaker 36 between the movable contact 21 at the winding 13 and the movable contact 31 at the winding 15. A winding 37 on the core 35 is connected in series with a circuit breaker 38 between the movable contact 24 at the winding 13 and the movable contact 32 at the winding 15. A winding 39 on a magnetic core 40 is connected in series with a circuit breaker 41 between the movable contact 22 at the winding 13 and the movable contact 33 at the winding 15. A winding 42 on the core 40 is connected in series with a circuit breaker 43 between the movable contact 23 at the winding 13 and the movable contact 30 at the winding 15.

A winding 44 on the core 35 is connected in series with the conductor or phase A of the main three phase circuit to be regulated. A winding 45 on the core 40 and a winding 46 on the core 35 are connected in series with each other and with the conductor or phase B of the main three phase circuit. A winding 47 on the core 40 and a winding 48 on the core 35 are connected in series with each other and with the conductor or phase C of the main three phase circuit. Thus, the windings 37, 34, 48, 46 and 44, being on the same core 35, are inductively coupled and the windings 39, 42, 45 and 47, being on the same core 40, are inductively coupled. The windings 37, 34, 39 and 42 have the same number of turns, are supplied with exciting currents from the windings 13 and 15 and act as primary windings for their respective cores. The windings 48, 46 and 44 act as secondary windings for the core 35 and the windings 45 and 47 act as secondary windings for the core 40. The numbers of turns in the various windings are such that the ratio of the voltage of either of the windings 48 and 46 to the voltage of the winding 44 is 50:100 and to the voltage of either of the windings 45 and 47 is 50:86.6. Thus, a vector representing the voltage of the winding 44 is equal to the hypotenuse of a triangle of which the other two sides represent the voltages of the series connected windings 48 and 47 or of the series connected windings 46 and 45. The vector sum of the voltages of the windings 48 and 47 or of the windings 46 and 45 is therefore equal to the voltage of the winding 44.

The voltages of the various windings shown in Figs. 1 and 2 are shown vectorially in Figs. 3 to 7 inclusive, the several vector diagrams showing the voltage relations corresponding to a few of the many possible connections of the movable contacts with the taps from the windings 13 and 15. For ease in referring to the different figures of the drawings, the same reference characters are applied to the voltage vectors in Figs. 3 to 7 as to the corresponding windings in Figs. 1 and 2.

The voltage relations corresponding to the particular positions of the movable contacts shown in Figs. 1 and 2 are shown by the vectors in Fig. 4. The voltages 13 and 15 are displaced at a right angle, being in phase with the voltages 11 and 10 respectively. Still referring to the particular connections indicated in Figs. 1, 2 and 4, the voltages 39 and 42 are in phase with each other and displaced by 30° from the voltage 15, assuming that the taps 17 and 19 are midway between the center and the two ends of the winding 13. The voltages 45 and 47 are in phase with the voltages 39 and 42 and are in series with the phases B and C respectively of the three phase circuit. The voltages 34 and 37 are in phase with each other and displaced by 30° from the voltage 13. The voltages 44, 46 and 48 are in phase with the voltages 34 and 37 and therefore displaced 90° from the voltages 39 and 42 and from the voltages 45 and 47. It is clear therefore that the voltage 44 is in series with phase A and displaced 30° from it. The resultant of the voltages 45 and 46 is equal to the voltage 44 and is in series with phase B and displaced 30° from it. The resultant of the voltages 47 and 48 is equal to the voltage 44 and is in series with phase C and displaced 30° from it. The three phase voltage ABC is thus increased or adjusted to a three phase voltage A'B'C' indicated by the triangle shown in broken lines in Fig. 4, the voltage A'B'C' being not only greater than the voltage ABC but being rotated or displaced counterclockwise through a small angle with respect to the voltage ABC. Figs. 3, 5, 6 and 7 are similar to Fig. 4 and will be readily understood as indicating the voltage relations of the various windings corresponding to a few of the many other possible positions of the movable contacts along the taps of the windings 13 and 15. Fig. 3, for example, indicates a condition where the voltage ABC has been increased to a greater voltage A'B'C' but without any phase displacement. Fig. 7 indicates a condition in which the voltages ABC and A'B'C' are very nearly equal but in which there is a considerable phase displacement.

As has been explained, there are many possible operative positions of the movable contacts along the taps of the windings 13 and 15 to obtain various voltage adjustments both as to value and phase angle, the number of adjustments possible being limited only by the number of taps distributed along the windings 13 and 15. However, in order to avoid distortion of the regulated three phase voltage, it is necessary that only such positions of the movable contacts be used as will maintain the voltages 34 and 37 at a right angle to the voltages 39 and 42.

The magnetic cores 35 and 40 have been described as each being provided with two primary windings, the windings 37 and 34 on the core 35 and the windings 39 and 42 on the core 40. The voltages of both primary windings on either core are equal and in phase and therefore the circuit of either primary winding on either core may be interrupted or broken and its load transferred to the other primary winding on the same core without appreciably affecting the conditions in the secondary windings. One advantage of the two primary windings instead of one on each of the cores 35 and 40 is that the load is distributed over a greater part of the windings 13 and 15 and a smaller conductor may therefore be used in these latter windings. Another advantage of the two primary windings on each core 35 and 40 is that it permits adjustments of the value or phase angle or both of the three phase voltage to be made without interrupting the current in the three phase circuit.

The adjustment or regulaton of the value or phase angle of the voltage may be changed, for example, by first opening the circuit breakers 36 and 43. This interrupts the currents in the primary windings 34 and 42, all the load then being carried by the other primary windings 37 and 39. The movable contacts 21, 31, 23 and 30 may then be moved without injury to any taps desired as they are carrying no current. The circuit breakers 36 and 43 are then closed. There will now be some distortion of the three phase voltage due to the fact that the four primary windings are not symmetrically connected to the windings 13 and 15. The circuit breakers 38 and 41 are next opened. This interrupts the currents in the primary windings 37 and 39 and the other primary windings 34 and 42 carry all the load. The movable contacts 24, 32, 22 and 33 are then moved to other taps such that all four of the primary windings will be symmetrically connected to the windings 13 and 15. The circuit breakers 38 and 41 are finally closed, thus completing the change in voltage regulation without having interrupted the load in the main three phase circuit. There is an interval during the change, of course, in which the proper voltage relations in the secondary windings 48, 46, 44, 45 and 47 are disturbed and this causes a slight distortion or unbalance of the regulated three phase voltage. The interval is brief, however, and the necessary distortion may be made as small as desired by providing a sufficient number of taps distributed sufficiently close together along the windings 13 and 15.

The invention provides a simple and inexpensive method and apparatus for regulating the value or phase angle or both of the voltage of a three phase circuit. The invention has been explained by describing and illustrating a particular form thereof but it will be apparent that various changes may be made without departing from the spirit of the invention or the scope of the appended claims.

What I claim as new and desire to secure by Letters Patent of the United States is:

1. The method of regulating the voltage of a three phase circuit, said method including the steps of transforming said three phase voltage to a two phase voltage, regulating said two phase voltage, and transforming the regulated two phase voltage to three voltages in the three conductors of said three phase circuit.

2. The method of regulating the voltage of a three phase circuit, said method including the steps of transforming said three phase voltage to a two phase voltage, regulating said two phase voltage, and transforming the regulated two phase voltage to three voltages out of phase and in the three conductors of said three phase circuit.

3. The combination with a three phase circuit of two windings, means excited from said three phase circuit for producing a two phase voltage in said windings, and windings in series with the three conductors of said three phase circuit and inductively coupled with said two phase windings.

4. The combination with a three phase circuit of two windings, means excited from said three phase circuit for producing a two phase voltage in said windings, windings in series with the three conductors of said three phase circuit and inductively coupled with said two phase windings, and means for varying the value of the voltage in said two phase windings, whereby the value of the voltage in said three phase circuit may be adjusted.

5. The combination with a three phase circuit of two windings, means excited from said three phase circuit for producing a two phase voltage in said windings, windings in series with the three conductors of said three phase circuit and inductively coupled with said two phase windings, and means for varying the phase angle of the voltage in said two phase windings, whereby the phase angle of the voltage in said three phase circuit may be adjusted.

6. The combination with a three phase circuit of two windings, means excited from said three phase circuit for producing a two phase voltage in said windings, windings in series with the three conductors of said three phase circuit and inductively coupled with said two phase windings, and means for varying the value and phase angle of the voltage in said two phase windings, whereby the value and phase angle of the voltage in said three phase circuit may be adjusted.

7. The combination with a three phase circuit of two windings provided with taps, means excited from said three phase circuit for producing a two phase voltage in said windings, a connection between intermediate points of said windings, two primary windings, means for connecting each of said primary windings between a selected tap in one of said tapped windings and a selected tap in the other of said primary windings, and secondary windings inductively coupled with said primary windings and connected in series with the three conductors of said three phase circuit.

8. The combination with a three phase circuit of two windings provided with taps, means excited from said three phase circuit for producing a two phase voltage in said windings, a connection between intermediate points of said windings, two primary windings, means for connecting each of said primary windings between a selected tap in one of said tapped windings and a selected tap in the other of said primary windings, and secondary windings inductively coupled with said primary windings and connected in series with the three conductors of said three phase circuit, there being two of said secondary windings in series with each of at least two of the conductors of said three phase circuit.

9. The combination with a three phase circuit of two windings provided with taps, means excited from said three phase circuit for producing a two phase voltage in said windings, a connection between intermediate points of said windings, four primary windings, means for connecting each of said primary windings between a selected tap in one of said tapped windings and a selected tap in the other of said primary windings, a circuit breaker in the circuit of each of said primary windings, and secondary windings inductively coupled with said primary windings and connected in series with the three conductors of said three phase circuit.

In witness whereof, I have hereunto set my hand this 17th day of April, 1930.

LOUIS F. BLUME.